(12) United States Patent
Kim

(10) Patent No.: US 9,787,921 B2
(45) Date of Patent: Oct. 10, 2017

(54) IMAGE SENSING DEVICE

(71) Applicant: SK hynix Inc., Gyeonggi-do (KR)

(72) Inventor: Tae-Gyu Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/046,022

(22) Filed: Feb. 17, 2016

(65) Prior Publication Data

US 2017/0094208 A1     Mar. 30, 2017

(30) Foreign Application Priority Data

Sep. 30, 2015    (KR) ........................ 10-2015-0137557

(51) Int. Cl.
     *H04N 5/365*      (2011.01)
     *H04N 5/3745*     (2011.01)
     *H04N 5/374*      (2011.01)
     *H04N 5/355*      (2011.01)
     *H04N 5/357*      (2011.01)
     *H04N 5/378*      (2011.01)

(52) U.S. Cl.
     CPC ......... *H04N 5/3658* (2013.01); *H04N 5/3559* (2013.01); *H04N 5/3575* (2013.01); *H04N 5/374* (2013.01); *H04N 5/378* (2013.01); *H04N 5/3745* (2013.01); *H04N 5/37452* (2013.01)

(58) Field of Classification Search
     CPC ........................................ H04N 5/357–5/3658
     See application file for complete search history.

(56) References Cited

U.S. PATENT DOCUMENTS

| | | | |
|---|---|---|---|
| 6,525,355 B2 | 2/2003 | Furumiya et al. | |
| 7,221,397 B1 * | 5/2007 | Kochi ................... | H04N 5/3572 250/208.1 |
| 2008/0259178 A1 * | 10/2008 | Oike ...................... | H04N 5/347 348/222.1 |
| 2013/0154705 A1 | 6/2013 | Sakurai et al. | |

* cited by examiner

*Primary Examiner* — Paul Berardesca
(74) *Attorney, Agent, or Firm* — IP & T Group LLP

(57) ABSTRACT

An image sensing device includes a pixel suitable for generating a pixel signal and an amplification block suitable for amplifying the pixel signal based on a predetermined amplification gain to adjust a conversion gain of the pixel.

14 Claims, 3 Drawing Sheets

IMAGE SENSING DEVICE

CROSS-REFERENCE TO RELATED APPLICATIONS

The present application claims priority of Korean Patent Application No. 10-2015-0137557, filed on Sep. 30, 2015, which is incorporated herein by reference in its entirety.

BACKGROUND

1. Field

Exemplary embodiments of the present invention relate to a semiconductor design technology and more particularly, to an image sensing device.

2. Description of the Related Art

Recently, consumer demand for image sensing devices has been increasing in various fields such as mobile cameras, digital cameras, monitoring cameras, and endoscopes for medical use.

Generally, an image sensing device, also referred to as an image sensor, captures images using the photosensitive properties of semiconductors. Image sensing devices may be classified into charge coupled device (CCD) image sensors and complementary metal oxide semiconductor (CMOS) image sensors. CMOS image sensors are more widely used and allow direct implementation of all needed analog and digital control circuits on a single integrated circuit (IC).

Although an image sensing device may generally adopt a correlated-double sampling (CDS) scheme for correcting fixed pattern noise occurring due to characteristics of a pixel, it is generally more difficult to correct process variations of a parasitic capacitor included in the pixel. Further, since an image sensing device may adopt a source follower structure between a pixel and a read-out path, conversion gains of the pixel may not be compensated or controlled.

SUMMARY

Various embodiments of the present invention are directed to an image sensing device that may be insensitive to process variations of a parasitic capacitor included in a pixel and adjust conversion gains.

According to an embodiment of the present invention, an image sensing device may include: a pixel suitable for generating a pixel signal; and an amplification block suitable for amplifying the pixel signal based on a predetermined amplification gain to adjust a conversion gain of the pixel.

The pixel may be coupled between an output terminal of the pixel signal and a common source terminal.

The amplification block may include: a first loading block coupled between a high voltage terminal and the output terminal; and a second loading block coupled between a low voltage terminal and the common source terminal.

Each of the first and second loading blocks may include a resistive element.

The amplification gain may be determined based on a resistance of the first loading block and a resistance of the second loading block.

The pixel may include: a photosensitive element suitable for generating photocharges based on incident light; a floating diffusion node suitable for accumulating the photocharges; a capacitive element coupled between the floating diffusion node and the low voltage terminal and suitable for accumulating the photocharges along with the floating diffusion node; and a driving element suitable for generating the pixel signal based on the floating diffusion node and the photocharges accumulated in the capacitive element.

The capacitive element may have a capacitance larger than parasitic capacitance of the floating diffusion node.

The pixel may further include: a transmission element suitable for transmitting the generated photocharges to the floating diffusion node; and a selection element coupled between the driving element and the common source terminal.

The pixel may further include: a reset element suitable for resetting the floating diffusion node and the capacitive element with a high voltage during a reset period.

According to an embodiment of the present invention, an image sensing device may include: a pixel array including a plurality of pixels arranged in columns and rows; a plurality of first common loading blocks whose one sides are coupled to an output terminal corresponding to the pixels arranged in the same column among the pixels in common and other sides are coupled to a high voltage terminal; and a plurality of second common loading blocks whose one sides are coupled to a source terminal corresponding to the pixels arranges in the same column among the pixels in common and other sides are coupled to a low voltage terminal, wherein each of the pixels includes a capacitive element coupled to a floating diffusion node.

Each of the pixels may include: a photosensitive element suitable for generating photocharges based on incident light; the floating diffusion node suitable for accumulating the photocharges; the capacitive element coupled between the floating diffusion node and the low voltage terminal and suitable for accumulating the photocharges along with the floating diffusion node; and a driving element suitable for generating a pixel signal based on the floating diffusion node and the photocharges accumulated in the capacitive element to output the pixel signal to the output terminal.

The capacitive element may have a capacitance larger than parasitic capacitance of the floating diffusion node.

Each of the pixels may further include: a transmission element suitable for transmitting the generated photocharges to the floating diffusion node; and a selection element coupled between the driving element and the common source terminal.

The pixel may further include: a reset element suitable for resetting the floating diffusion node and the capacitive element with a high voltage during a reset period.

Each of the first and second common loading blocks may include a resistive element.

According to an embodiment of the present invention, a pixel of an image sensing device may include: a photosensitive element suitable for generating photocharges based on incident light; a driving element suitable for generating a pixel signal based on a voltage loaded on a floating diffusion node; and a capacitive element coupled between the floating diffusion node and a low voltage terminal.

The pixel may further include: a transmission element suitable for transmitting the generated photocharges to the floating diffusion node; and a selection element coupled between the driving element and a common source terminal.

The pixel may further include: a reset element suitable for resetting the floating diffusion node and the capacitive element with a high voltage during a reset period.

The voltage loaded on the floating diffusion node may correspond to a sum of photocharges accumulated in the floating diffusion node and photocharges accumulated in the capacitive element.

The capacitive element may have a capacitance larger than parasitic capacitance of the floating diffusion node.

DETAILED DESCRIPTION

Exemplary embodiments of the present invention are described below in more detail with reference to the accompanying drawings. These embodiments are provided so that this disclosure is thorough and complete. All "embodiments" referred to in this disclosure refer to embodiments of the inventive concept disclosed herein. The embodiments presented are merely examples and are not intended to limit the inventive concept.

The terminology used herein is for the purpose of describing particular embodiments only, and it is not intended to be limiting of the inventive concept. As used herein, the singular forms "a", "an" and "the" are intended to include the plural forms as well, unless the context clearly indicates otherwise. It is also noted that in this specification, "connected/coupled" refers to one component not only directly coupling another component but also indirectly coupling another component through an intermediate component. It will be further understood that the terms "comprises," "includes," "comprising," and/or "including," when used in this specification, indicate the presence of stated features, but do not preclude the presence or addition of one or more other features. As used herein, the term "and/or" indicates any and all combinations of one or more of the associated listed items.

Figure 1:
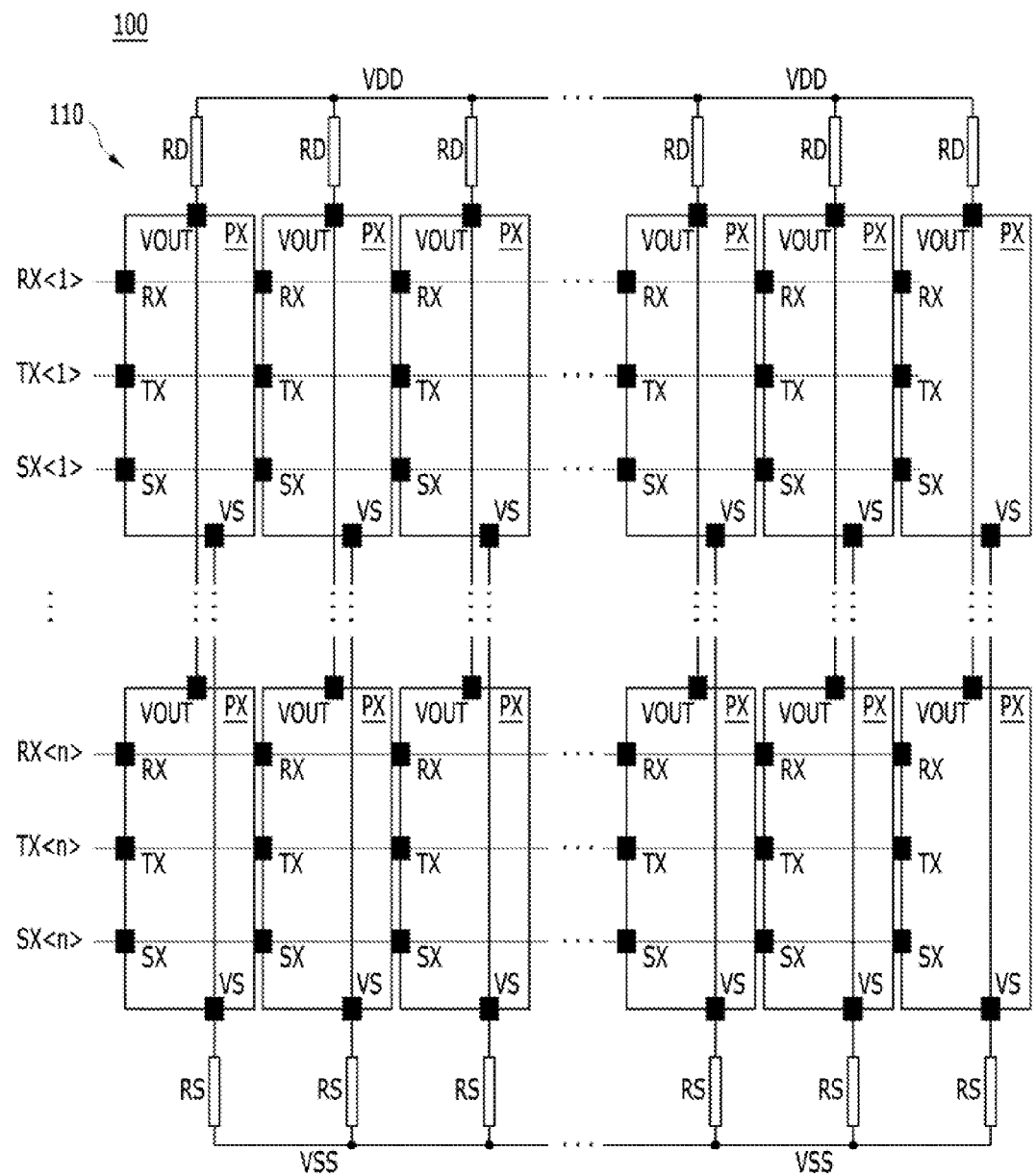
FIG. 1 is a diagram illustrating an image sensing device, according to an embodiment of the present invention.

Referring now to FIG. 1 an image sensing device 100 is provided, according to an embodiment of the present invention. The image sensing device 100 may include a pixel array 110, a plurality of first common loading blocks RDs, and a plurality of second common loading blocks RSs.

The pixel array 110 may include a plurality of pixels PXs arranged in rows and columns. For example, the pixel array 110 may include n*m pixels PXs, where n and m are natural numbers equal to or greater than 2. The pixel array 110 may operate by rows based on operation control signals RX<1:n>, TX<1:n> and SX<1:n> by rows. For example, m pixels arranged in a first row may output first to $m^{th}$ pixel signals simultaneously, through an output terminal VOUT based on first operation control signals RX<1>, TX<1> and SX<1>, and m pixels arranged in an $n^{th}$ row may output the first to $m^{th}$ pixel signals simultaneously, through the output terminal VOUT based on $n^{th}$ operation control signals RX<n>, TX<n> and SX<n>.

One end of each of the first common loading blocks RDs may be coupled to the output terminal VOUT of pixels arranged in the same column among the pixels PXs included in the pixel array 110. The other end of each of the first common loading blocks RDs may be coupled to a high voltage VDD terminal. For example, the common output terminal VOUT of pixels arranged in one column may be coupled to one end of a corresponding first common loading block RD and the high voltage VDD terminal may be coupled to the other end of the corresponding first common loading block RD. In other words, a single first common loading block RD may be included in a single column. Each of the first common loading blocks RDs may include resistive elements such as a fixed resistance, a variable resistance and a current source. Hereinafter, the output terminal VOUT corresponding to pixels arranged in the same column is referred to as a "common output terminal".

One end of each of the second common loading blocks RSs may be coupled to a source terminal VS corresponding to the pixels arranged in the same column among the pixels PXs included in the pixel array 110. The other end of each of the second common loading blocks RSs may be coupled to a low voltage VSS terminal (e.g., a ground). For example, the common source terminal VS of pixels arranged in one column may be coupled to one end of a corresponding second common loading block RS in common, and the low voltage VSS terminal may be coupled to the other side of the corresponding second common loading block RS. In other words, a single second common loading block RS may be included in a single column. Each of the second common loading blocks RSs may include the resistive elements. Hereinafter, the source terminal VS corresponding to the pixels arranged in the same column is referred to as a "common source terminal".

Figure 2:
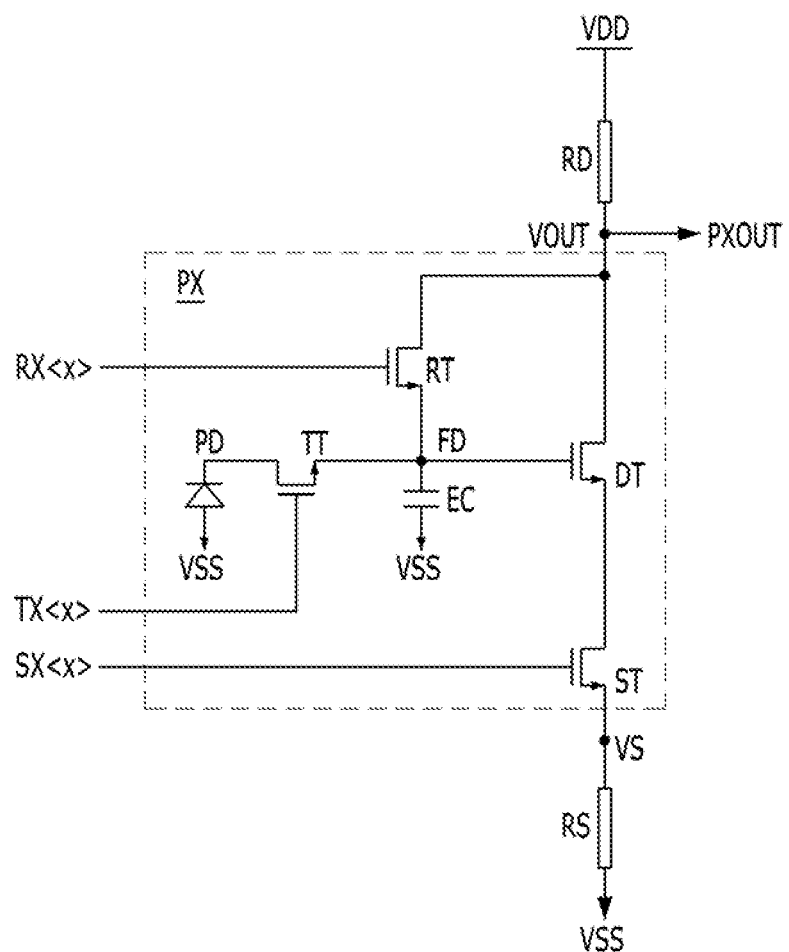
FIG. 2 is a detailed diagram of an example of a pixel shown in FIG. 1.

FIG. 2 shows a coupling relationship of a pixel PX used in the pixel array 110 of FIG. 1 and corresponding first and second common loading blocks RD and RS.

Referring to FIG. 2, the pixel PX may have a 4-transistor structure. For example, the pixel PX may include 4 transistors such as a reset element RT, a transmission element TT, a driving element DT and a selection element ST. The pixel PX may further include a photosensitive element PD, a floating diffusion node FD and a capacitive element (or accumulation element) EC.

The photosensitive element PD may generate photocharges corresponding to incident light. For example, the photosensitive element PD may include a photo diode.

The reset element RT may reset the floating diffusion node FD and the capacitive element EC with a high voltage VDD during a reset period based on a reset control signal RX<x>. For example, the reset element RT may include an NMOS transistor having a gate coupled to an input terminal of the reset control signal RX<x> and a drain and a source coupled between the common output VOUT terminal and the floating diffusion node FD.

The transmission element TT may transmit the photocharges generated by the photosensitive element PD to the floating diffusion node FD and the capacitive element EC during a data period based on a transmission control signal TX<x>. For example, the transmission element TT may include an NMOS transistor having a gate coupled to an input terminal of the transmission control signal TX<x> and a drain and a source coupled between the photosensitive element PD and the floating diffusion node FD.

The driving element DT may output a reset signal corresponding to a voltage level of the floating diffusion node FD as a pixel signal PXOUT through the common output terminal VOUT, during the reset period. The driving element DT may output a data signal corresponding to the voltage level of the floating diffusion node FD as the pixel signal PXOUT through the common output terminal VOUT, during the data period. For example, the driving element DT may have a gate coupled to the floating diffusion node FD and a drain and a source coupled between the common output terminal VOUT and the selection element ST.

The selection element ST may couple the driving element DT to the common source terminal VS during the reset period and the data period based on a selection control signal SX<x>. For example, the selection element ST may have a gate coupled to an input terminal of the selection control signal SX<x> and a drain and a source coupled between a source of the driving element DT and the common source terminal VS.

The floating diffusion node FD may be reset by the reset element RT and accumulate the photocharges transmitted through the transmission element TT. The floating diffusion node FD may accumulate the photocharges through parasitic capacitance CFD. The parasitic capacitance CFD may include first parasitic capacitance between the reset element RT and the floating diffusion node FD, second parasitic capacitance between the transmission element TT and the floating diffusion node FD, third parasitic capacitance between the driving element DT and the floating diffusion node FD, junction capacitance of the floating diffusion node FD, and so on. For example, a parasitic capacitive element, e.g., the parasitic capacitor, having the parasitic capacitance CFD may be formed in the floating diffusion node FD.

The capacitive element EC may be coupled between the floating diffusion node FD and the low voltage VSS terminal. The capacitive element EC may be reset by the reset element RT and accumulate the photocharges transmitted through the transmission element TT along with the floating diffusion node FD. The capacitive element EC may accumulate the photocharges through electrostatic capacitance CFM. Particularly, the electrostatic capacitance CFM of the capacitive element EC may be designed to have a capacitance greater than the parasitic capacitance CFD of the floating diffusion node FD. For example, the capacitive element EC may include a capacitor. Preferably, the capacitive element EC, e.g., the capacitor, may be coupled in parallel with the parasitic capacitor formed in the floating diffusion node FD.

It is noted, that although a pixel having the 4-transistor structure including 4 MOS transistors TT, RT, DT and ST is illustrated in FIG. 2, the invention is not limited to this. For example, the present invention may employ pixels including at least 3 transistors RT, DT and ST. For example, the invention may employ a 3 or more transistors structure. Further, although a pixel PX formed of NMOS transistors is described herein, the invention is not limited in to this either. For example, the invention may employ a pixel formed of PMOS transistors.

The first and the second common loading blocks RD and RS may control conversion gains CG of the pixel PX. For example, the first and second common loading blocks RD and RS may be included an amplification block that amplifies the pixel signal PXOUT outputted through the common output terminal VOUT based on a predetermined amplification gain. The amplification gain may be defined based on a resistance of the first common loading block RD and a resistance of the second common loading block RS (refer to Equation 2 below).

Figure 3:
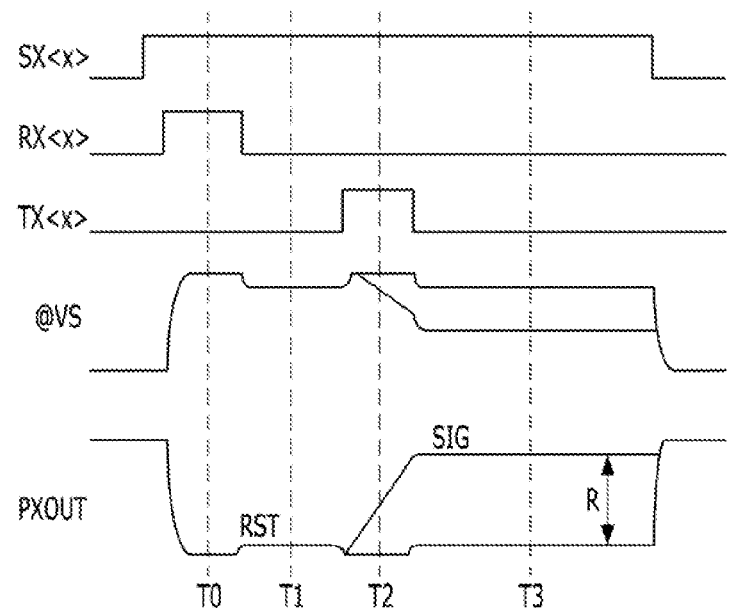
FIG. 3 is a timing diagram for an operation of the image sensing device shown in FIG. 1, according to an embodiment of the present invention.
Figure 4:
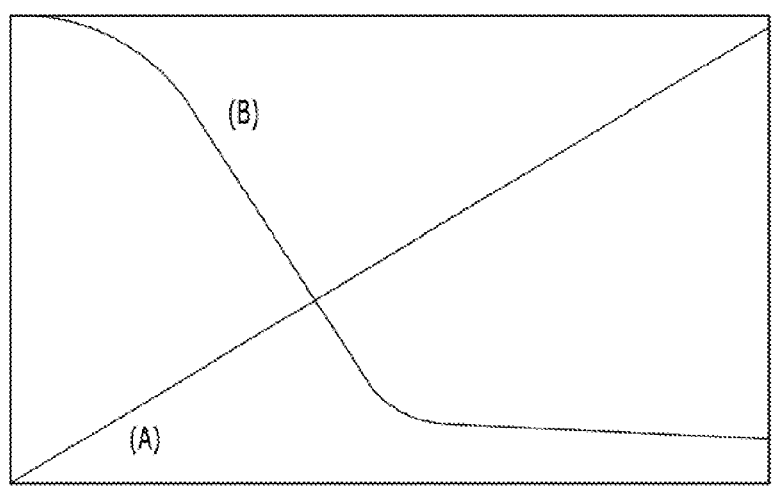
FIG. 4 is a diagram illustrating a voltage (A) loaded on a floating diffusion node FD, and a voltage (B) of a pixel signal PXOUT based on (A), during an operation of the image sensing device shown in FIG. 3.

FIG. 3 is a timing diagram for describing an operation of the image sensing device 100 shown in FIG. 1. FIG. 4 is a diagram for describing a voltage of the common output terminal VOUT based on a voltage loaded on the floating diffusion node FD.

According to an embodiment of the present invention, an operation of a pixel PX among the pixels PXs included in the pixel array 110 is representatively described below.

Referring to FIG. 3, the image sensing device 100 may operate as follows. While the selection element ST is turned on based on the selection control signal SX<x>, the reset element RT may reset the floating diffusion node FD based on the reset control signal RX<x> during the reset period at time T0, and the driving element DT may output a reset signal RST corresponding to the voltage loaded on the floating diffusion node FD through the common output terminal VOUT during the reset period at time T1. Subsequently, the transmission element TT may transmit the photocharges generated by the photosensitive element PD to the floating diffusion node FD based on the transmission control signal TX<x> during the data period at time T2, and the driving element DT may output a data signal SIG corresponding to the voltage loaded on the floating diffusion node FD through the common output terminal VOUT during the data period at time T3. Herein, the reference numeral "R" indicates a range of an output voltage level of the data signal SIG.

In case of the image sensing device 100, according to an embodiment of the present invention, the voltage loaded on the floating diffusion node FD may be defined as shown in the following Equation.

$$V_{FD} = \frac{q}{CFD + CFM} \quad \text{[Equation 1]}$$

wherein, "$V_{FD}$" is the voltage loaded on the floating diffusion node FD, and "q" is a charge amount.

Furthermore, an amplification gain of the pixel signal PXOUT outputted through the common output terminal VOUT may be defined as shown in the following Equation.

$$VOUTg = \frac{-gmR_D}{1 + gmR_s} \approx -\frac{R_D}{R_S} \quad \text{[Equation 2]}$$

Herein, "VOUTg" is the amplification gain, "gm" is a gain of the selection element SX, "$R_D$" is a resistance of the first common loading block RD, and the "$R_S$" is a resistance of the second common loading block RS.

Referring to Equation 2, since the amplification gain VOUTg is irrelevant to the gain gm of the selection element SX, the amplification gain VOUTg may be determined based on the resistance $R_D$ of the first common loading block RD and the resistance $R_S$ of the second common loading block RS. This may mean that a conversion gain CG of the pixel PX may be controlled.

After the operation corresponding to the time T3 among the aforementioned operations, the image sensing device 100 may perform a sampling operation, e.g., a correlated-double sampling (CDS) operation. A result value obtained by the CDS operation may be defined as shown in the following equation.

$$V_{CDS} = V_{RD,SIG} - V_{FD,RST} = -\frac{R_D}{R_S} \times \frac{q}{CFD + CFM} \quad \text{[Equation 3]}$$

wherein "$V_{CDS}$" is the result value obtained by the CDS operation, "$V_{FD,SIG}$" is a voltage of the floating diffusion node FD corresponding to the data signal SIG, and "$V_{FD,RST}$" is a voltage of the floating diffusion node FD corresponding to the reset signal RST.

That is, as the parasitic capacitance CFD and the electrostatic capacitance CFM are used together in the embodiment of the present invention, the total capacitance of the floating diffusion node FD may increase. The total capacitance may be represented by a full well capacity (FWC). In other words, the FWC may correspond to the sum of the parasitic capacitance CFD and the electrostatic capacitance CFM (i.e., FWC=CFD+CFM). The parasitic capacitance CFD is vulnerable to process variations, however, the electrostatic capacitance CFM is not vulnerable to the process variations. Accordingly, the pixel PX may be insensitive to the process variations when the electrostatic capacitance CFM is designed to have a high capacitance relative to the parasitic capacitance CFD.

Since the conversion gain CG of the pixel PX is in inverse proportion to the capacitance of the floating diffusion node FD, the conversion gain CG may decrease as much as the electrostatic capacitance CFM increases. However, in an embodiment of the present invention, as the pixel signal PXOUT is amplified through a common source structure, i.e., the first and second common loading blocks RDs and RSs, the decreased conversion gain CG may be compensated for. Referring to FIG. 4, "(A)" indicates the voltage loaded on the floating diffusion node FD, and "(B)" indicates a voltage of the pixel signal PXOUT based on "(A)". A slope of "(B)" indicates the conversion gain CG. As the slope of "(B)" is steeper than a slope of "(A)", it may be seen that the conversion gain CG is compensated for. Further, with the proper resistance of the first and second common loading blocks RDs and RSs, the conversion gain CG may be freely controlled.

According to embodiments of the present invention, a physical capacitive element EC is intentionally coupled to the floating diffusion node FD causing the total capacitance of the floating diffusion node FD to increase. As a result, the capacitance of the floating diffusion node FD may become more stable or uniform and the image sensing device becomes less sensitive to process variations. Further, the conversion gain CG of a pixel PX may be controlled through a common source structure.

According to the embodiments of the present invention, performance of an image sensing device may be improved since the image sensing device may become less sensitive to process variations of a parasitic capacitor included in a pixel. The image sensing device may also adjust (i.e., compensate for or control) conversion gains.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

What is claimed is:

1. An image sensing device, comprising:
a pixel generating a pixel signal; and
an amplification block amplifying the pixel signal based on a predetermined amplification gain to adjust a conversion gain of the pixel,
wherein the amplification block includes:
a first loading block coupled between a high voltage terminal and the output terminal; and
a second loading block coupled between a low voltage terminal and the common source terminal,
wherein the predetermined amplification gain is defined as shown in a following equation:

$$VOUTg = \frac{-gmR_D}{1+gmR_S} \approx -\frac{R_D}{R_S}$$

where "VOUTg" is an amplification gain, "gm" is a gain of a selection element, "$R_D$" is a resistance of a the first loading block and "Rs" is a resistance of the second loading block.

2. The image sensing device of claim 1, wherein the pixel is coupled between an output terminal of the pixel signal and a common source terminal.

3. The image sensing device of claim 1, wherein each of the first and second loading blocks includes a resistive element.

4. The image sensing device of claim 1, wherein the amplification gain is determined based on a resistance of the first loading block and a resistance of the second loading block.

5. The image sensing device of claim 2, wherein the pixel includes:
a photosensitive element generating photocharges based on incident light;
a floating diffusion node accumulating the photocharges;
a capacitive element coupled between the floating diffusion node and the low voltage terminal and accumulating the photocharges along with the floating diffusion node; and
a driving element generating the pixel signal based on the floating diffusion node and the photocharges accumulated in the capacitive element.

6. The image sensing device of claim 5, wherein the capacitive element has a capacitance larger than parasitic capacitance of the floating diffusion node.

7. The image sensing device of claim 5, wherein the pixel further includes:
a transmission element transmitting the generated photocharges to the floating diffusion node; and
a selection element coupled between the driving element and the common source terminal.

8. The image sensing device of claim 7, wherein the pixel further includes:
a reset element resetting the floating diffusion node and the capacitive element with a high voltage during a reset period.

9. An image sensing device, comprising:
a pixel array including a plurality of pixels arranged in columns and rows; and
a plurality of common loading blocks amplifying pixel signals generated from the pixels based on predetermined amplification gains to adjust conversion gains of the pixels,
wherein the plurality of common loading blocks comprises:
a plurality of first common loading blocks whose one sides are coupled to an output terminal corresponding to the pixels arranged in the same column among the pixels in common and other sides are coupled to a high voltage terminal; and
a plurality of second common loading blocks whose one sides are coupled to a source terminal corresponding to the pixels arranges in the same column among the pixels in common and other sides are coupled to a low voltage terminal,
wherein each of the pixels includes a capacitive element coupled to a floating diffusion node.

10. The image sensing device of claim 9, wherein each of the pixels includes:
- a photosensitive element generating photocharges based on incident light;
- the floating diffusion node accumulating the photocharges;
- the capacitive element coupled between the floating diffusion node and the low voltage terminal and accumulating the photocharges along with the floating diffusion node; and
- a driving element generating a pixel signal based on the floating diffusion node and the photocharges accumulated in the capacitive element to output the pixel signal to the output terminal.

11. The image sensing device of claim 10, wherein the capacitive element has a capacitance larger than parasitic capacitance of the floating diffusion node.

12. The image sensing device of claim 10, wherein each of the pixels further includes:
- a transmission element transmitting the generated photocharges to the floating diffusion node; and
- a selection element coupled between the driving element and the common source terminal.

13. The image sensing device of claim 12, wherein the pixel further includes:
- a reset element resetting the floating diffusion node and the capacitive element with a high voltage during a reset period.

14. The image sensing device of claim 9, wherein each of the first and second common loading blocks includes a resistive element.

* * * * *